US012652350B2

(12) United States Patent
Seely et al.

(10) Patent No.: US 12,652,350 B2
(45) Date of Patent: Jun. 9, 2026

(54) AUTOMATED CALLING NUMBER VERIFICATION

(71) Applicant: FIRST ORION CORP., North Little Rock, AR (US)

(72) Inventors: Robert Collin Seely, Little Rock, AR (US); Perry Lee Claunch, Conway, AR (US); William Brice Smith, Conway, AR (US)

(73) Assignee: FIRST ORION CORP., North Little Rock, AR (US)

( * ) Notice: Subject to any disclaimer, the term of this patent is extended or adjusted under 35 U.S.C. 154(b) by 319 days.

(21) Appl. No.: 18/232,811

(22) Filed: Aug. 10, 2023

(65) Prior Publication Data

US 2025/0055938 A1      Feb. 13, 2025

(51) Int. Cl.
*H04M 3/436*          (2006.01)

(52) U.S. Cl.
CPC .................................. *H04M 3/436* (2013.01)

(58) Field of Classification Search
CPC .................................................... H04M 3/436
See application file for complete search history.

(56) References Cited

U.S. PATENT DOCUMENTS

| | | | |
|---|---|---|---|
| 5,799,060 A | 8/1998 | Kennedy et al. | |
| 6,292,909 B1 | 9/2001 | Hare | |
| 6,999,572 B1 * | 2/2006 | Shaffer ................. | H04M 3/428 |
| | | | 379/214.01 |
| 7,215,749 B1 | 5/2007 | Liebenow | |

| | | | |
|---|---|---|---|
| 11,558,502 B1 * | 1/2023 | Howell ................. | H04M 3/436 |
| 2005/0069104 A1 * | 3/2005 | Hanson ................. | H04M 7/006 |
| | | | 379/88.19 |
| 2007/0297587 A1 * | 12/2007 | Urban ............... | H04M 1/72403 |
| | | | 379/142.17 |
| 2008/0080680 A1 | 4/2008 | Burns | |
| 2009/0103703 A1 | 4/2009 | Lindsey et al. | |
| 2010/0046507 A1 * | 2/2010 | Rosenberg .......... | H04M 7/0078 |
| | | | 370/352 |
| 2010/0082828 A1 * | 4/2010 | Jennings ................. | H04L 63/08 |
| | | | 370/352 |
| 2016/0021246 A1 * | 1/2016 | Forbes .................. | H04W 4/029 |
| | | | 370/259 |
| 2021/0281680 A1 | 9/2021 | Gupta et al. | |
| 2023/0262161 A1 * | 8/2023 | Merchant .......... | H04M 3/42357 |
| | | | 455/415 |

OTHER PUBLICATIONS

International Search Report issued in the International Application No. PCT/US24/39067, mailed on Oct. 10, 2024.
Written Opinion issued in the International Application No. PCT/US24/39067, mailed on Oct. 10, 2024.

* cited by examiner

*Primary Examiner* — David Bilodeau

(57) ABSTRACT

An example may include verifying a call number to be used by an enterprise entity by selecting an enterprise number to verify from a database of one or more enterprise numbers assigned to a particular enterprise entity, initiating an outbound call destined to the enterprise number from an origination number known to an enterprise platform, receiving a return call to the origination number from the enterprise number, determining whether the return call was received within a defined time interval, and updating the enterprise number status in memory as a verified enterprise number when the return call was received within the defined time interval.

20 Claims, 6 Drawing Sheets

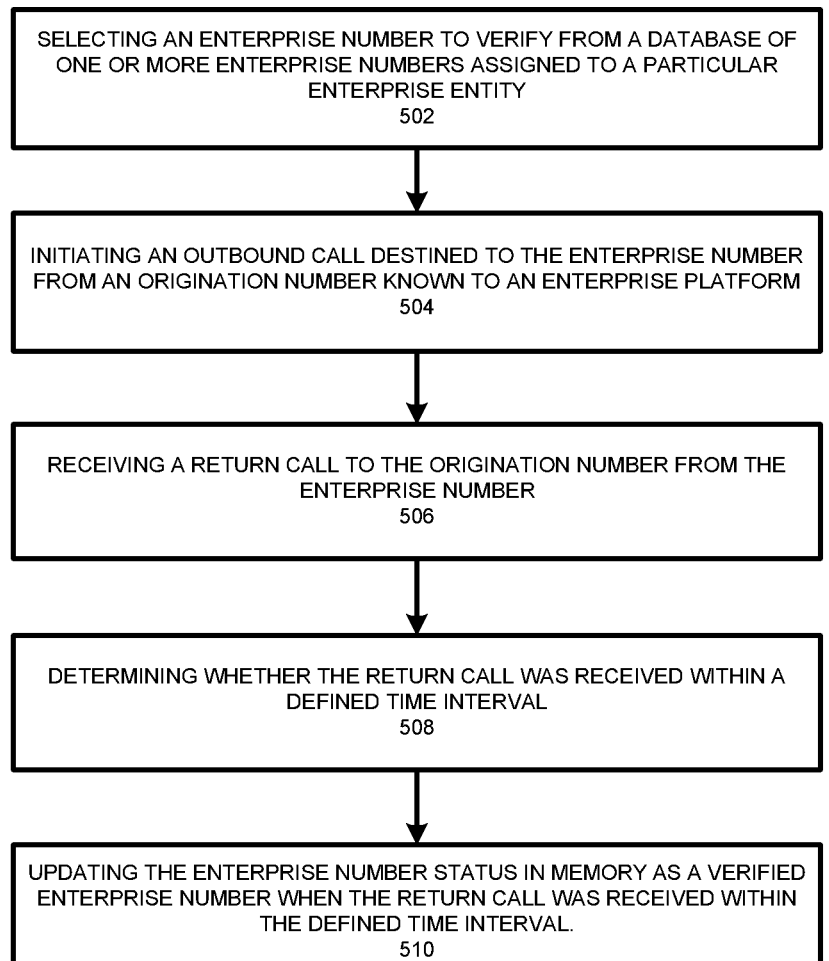

SELECTING AN ENTERPRISE NUMBER TO VERIFY FROM A DATABASE OF
ONE OR MORE ENTERPRISE NUMBERS ASSIGNED TO A PARTICULAR
ENTERPRISE ENTITY
502

INITIATING AN OUTBOUND CALL DESTINED TO THE ENTERPRISE NUMBER
FROM AN ORIGINATION NUMBER KNOWN TO AN ENTERPRISE PLATFORM
504

RECEIVING A RETURN CALL TO THE ORIGINATION NUMBER FROM THE
ENTERPRISE NUMBER
506

DETERMINING WHETHER THE RETURN CALL WAS RECEIVED WITHIN A
DEFINED TIME INTERVAL
508

UPDATING THE ENTERPRISE NUMBER STATUS IN MEMORY AS A VERIFIED
ENTERPRISE NUMBER WHEN THE RETURN CALL WAS RECEIVED WITHIN
THE DEFINED TIME INTERVAL.
510

AUTOMATED CALLING NUMBER VERIFICATION

BACKGROUND

Conventionally, caller identification (ID) spoofing refers to the practice of manipulating the information displayed on a recipient device caller ID display to make it appear as if the call is originating from a different phone number or entity than the entity that is actually performing the call. This scam technique is commonly used by scammers and fraudsters to deceive and defraud unsuspecting individuals to trick call recipients into believing they are receiving a call from a known or trusted party.

As branded calling becomes more common and more 'A' numbers start showing a brand there is a need for verification of number ownership on a continuous basis to reduce concerns, such as spoofing and other types of fraud. Displaying the wrong brand display name or blocking an 'A' number that is not owned by the enterprise that set up the call is a concern. Using a traditional verification approach of manually dialing 'A' numbers introduces a cost and a delay in how long it will take to set up a customer on a calling platform.

There may be a large number of branded calling 'A' numbers used with a branded communication exchange ("exchange") that need to have their ownership verified. As stricter rules are employed regarding the usage of 'A' numbers with other call blocking solutions, the ownership of the 'A' numbers becomes more of a concern. If the wrong party claims an 'A' number, the result could be misuse causing damage to an organization's reputation. Also, enterprises may rotate 'A' numbers within their calling platforms. The numbers can go back into pools of 'A' numbers that other companies can start using in their own calling platforms. The result of this 'A' number usage means that verification of these numbers is not a single verification process and must be performed on a continuous basis.

SUMMARY

Example embodiments of the present application provide a method that includes one or more of selecting an enterprise number to verify from a database of one or more enterprise numbers assigned to a particular enterprise entity, initiating an outbound call destined to the enterprise number from an origination number known to an enterprise platform, receiving a return call to the origination number from the enterprise number, determining whether the return call was received within a defined time interval, and updating the enterprise number status in memory as a verified enterprise number when the return call was received within the defined time interval.

Another example embodiment may include an apparatus that includes a processor configured to select an enterprise number to verify from a database of one or more enterprise numbers assigned to a particular enterprise entity, initiate an outbound call destined to the enterprise number from an origination number known to an enterprise platform, a receiver configured to receive a return call to the origination number, and the processor is further configured to determine whether the return call was received within a defined time interval, and update the enterprise number status in memory as a verified enterprise number when the return call was received within the defined time interval.

Another example embodiment may include a non-transitory computer readable storage medium configured to store instructions that when executed cause a processor to perform selecting an enterprise number to verify from a database of one or more enterprise numbers assigned to a particular enterprise entity, initiating an outbound call destined to the enterprise number from an origination number known to an enterprise platform, receiving a return call to the origination number from the enterprise number, determining whether the return call was received within a defined time interval, and updating the enterprise number status in memory as a verified enterprise number when the return call was received within the defined time interval.

BRIEF DESCRIPTION OF THE DRAWINGS

FIG. 5 illustrates an example calling number verification process according to example embodiments.

DETAILED DESCRIPTION

Figure 1:
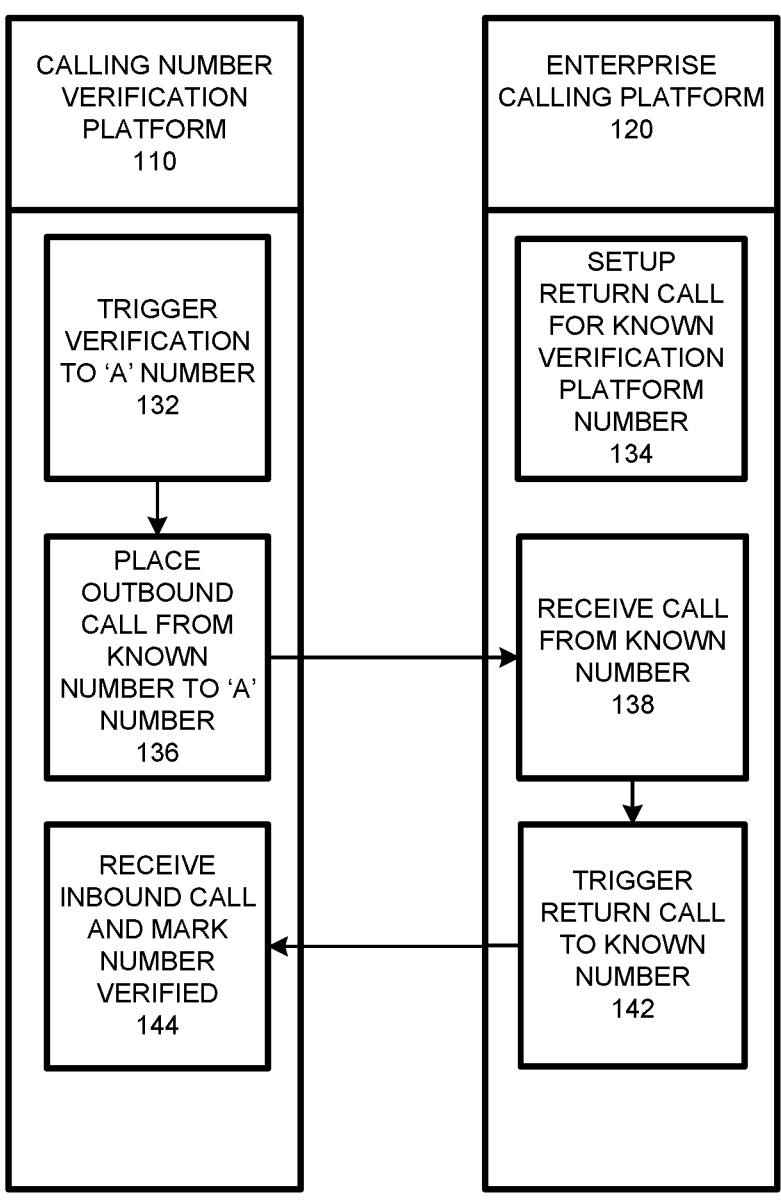
FIG. 1 illustrates a call network configuration process of verifying an enterprise calling number according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide calling number management of calling 'A' numbers used by an enterprise to place calls to various end users, such as mobile devices. Enterprise entities (e.g., government entities, corporate entities, etc.) may desire to have their services readily identified by images, symbols, video, text, and other types of enhanced content delivered to mobile devices when providing appointments, services, advertising, etc. Mobile device users require secure communication channels to reduce fraud associated with scam callers and other falsified entities seeking to monetize from users by using unexpected and undesirable approaches, such as solicitation calls and mobile device messages (SMS).

Call enhancement services (CES) may be provided as a communication exchange ("exchange"), a call enhancement service application (CESA), and/or a content delivery network (CDN). Each entity of the call enhancement platform may be an enterprise server, a cloud server, and/or separate or common server devices which are accessible by mobile devices, enterprise entities and other third parties which are participating in the call enhancement process. The CESA may be deployed within a dedicated network 'delegator' device but does not have to be limited to one particular entity in a private network and/or via a cloud computing network. The 'exchange' is a call and data processing computer or other processing entity that manages a branded calling program(s). A 'program' is a group of content/assets, a schedule, and other information that utilizes call data, such as associated telephone numbers, and provides pairing and matching of information for transfer purposes. An organization can have more than one program operating concurrently, and the program that is selected/usable at any particular time may be based on call requirements, except for the case of a pre-call function, in which a valid schedule is required to deliver branded communications. Programs can be created, deleted, and updated. Schedules, telephone numbers, and assets can be added, deleted, and updated. Data inputs provided to the 'exchange' may come from a customer portal or lightweight APIs or both. The 'exchange' is also the provisioning entity to the CESA that delivers the branded calling experience to a service provider. The 'exchange' uses brokers to facilitate the program's data management with the CESA. A valid program is required along with a validity schedule. Pre-call functionality defines the calling/called number pair for a specific upcoming call and any limited period of time in which the call must be placed.

FIG. 1 illustrates a call network configuration process of verifying an enterprise calling number according to example embodiments. Referring to FIG. 1, the enterprise calling platform 120 may be any calling platform that is used to dial telephone numbers out to call recipients. The telephone numbers used by the enterprise entity may include one or more 'A' numbers which are known and shared with the calling number verification platform 110 as a separate entity used to verify the authenticity of the 'A' numbers based on known information about the enterprise. The 'A' number(s) may be sent to the calling number verification platform ahead of a verification process being performed.

The automated calling number verification platform 110 may be used to confirm large volumes of calling party numbers ('A' numbers) on a continuous basis. The automated process attempts to avoid having to manually dial these 'A' numbers for an initial setup verification and again at various time intervals to reverify possession of the number prior to permitting the 'A' numbers to be used and paired with enhanced content during call placement.

The enterprise may initiate the beginning of a call number setup process by transferring the 'A' numbers intended to be used by the enterprise in the near future (defined by a timer period) to a customer portal entity which collects the information and forwards the information to a call exchange which will verify and perform 'vetting' of the 'A' numbers along with any content that is intended to be paired with those numbers. Each 'A' number may be paired with certain content to be retrieved and sent with the calls that are placed.

The client 'enterprise' may be required to confirm certain information or transfer certain information in order to preserve the right of use for a particular phone number. The verification platform 110 will attempt to place an impromptu outbound call destined for a particular 'A' number to the calling platform 120 for the 'A' party, which is setup to trigger a return call to the calling number platform from the same 'A' number. This call attempt and return confirmation will occur at a time determined by the platform 110 and will only permit a verified response within a time to live (TTL) that is set for a finite period of time to limit call number spoofing potential by third parties attempting to use that same 'A' number for unauthorized purposes. Examples of a TTL duration may be 'X' minutes.

The call number verification process is considered complete when the calling party returns the call from the correct phone number. If the verification process is broken because the calling party cannot be reached or does not respond during the TTL window that will trigger corrective action on the calling party. This is especially important for the previously mentioned blocking scenario where an unresolved verification process will impact the usage of the calling number.

Referring again to FIG. 1, the calling number verification platform 110 will perform an automated attempt to establish a communication handshake (back and forth communication) for a given calling party 'A' number. The enterprise calling platform 120 is set up ahead of time for the 'A' number call to be received and to have the calling platform 120 place a call back to the verification platform 100 when a call is received from one of the pre-agreed upon numbers 134. The number that is used to dial the 'A' number must be known by the calling platform 120 and stored in memory.

During a call process the 'A' number is called 132 by the calling number platform 110, the call is placed from the known number to the 'A' number 136. The enterprise calling platform 120 may then receive the call to the 'A' number and parse the calling number to compare the number to the known number information stored in memory 138. The enterprise calling platform 120 may then trigger an automated return call to be made from the 'A' number to the return number 142 and when received, the verification platform can then mark the inbound call as evidence the 'A' number has been verified 144. The return call should generally be to the known number and placed from the 'A' number just used during the outbound call from the verification platform. The return call could also be from a different number and to a different number, however, whichever numbers are used during the return call should be known by both parties as verified from a list in memory. The known numbers which may be used during verification may be established by the verification platform entity as a third party working with the enterprise platform. The known number(s) may be shared ahead of time of any verification process. Then, as a known number is used by the verification platform 110, the enterprise 120 may recall the 'known' number used during the verification outbound call from memory to match the number received. If the number is not in memory at the enterprise platform 120, the process will fail.

Figure 2:
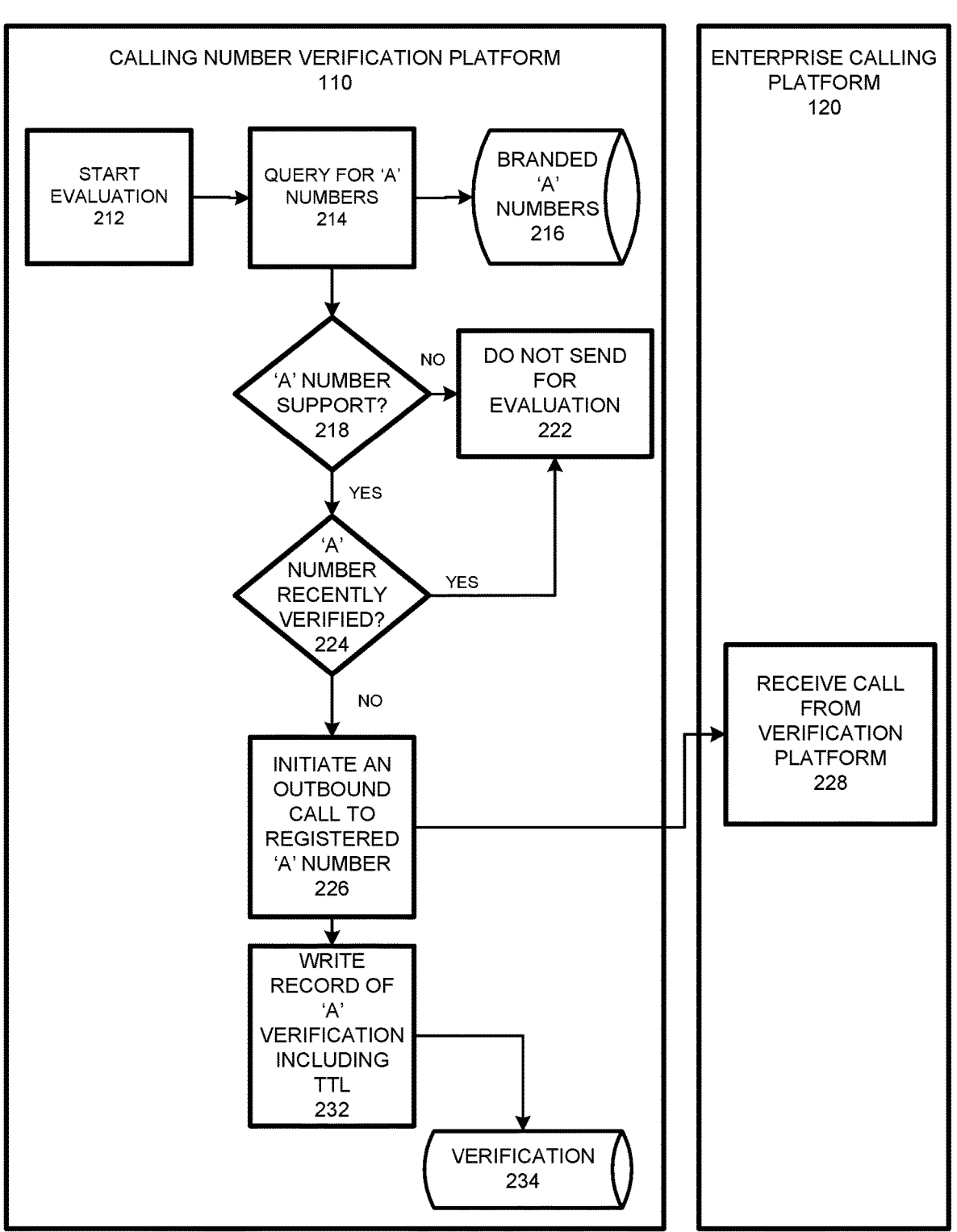
FIG. 2 illustrates a call network configuration of verifying registered enterprise calling numbers by an outbound call process according to example embodiments.

FIG. 2 illustrates a call network configuration of verifying registered enterprise calling numbers by an outbound call process according to example embodiments. Referring to FIG. 2, the calling number evaluation process begins 212 and then attempts to identify by query which 'A' numbers 214 are stored for a particular enterprise entity. The 'A' numbers are identified as being associated with a particular set of branded numbers 216 registered to one or more known enterprise businesses and are intended to be used with enhanced content. A determination is made as to whether there is 'A' number support 218 indicating that the 'A' number when dialed will receive a return response. If not, the number will not be dialed 222 if so, then a decision is made regarding whether the 'A' number has already receive a recently verified status 224, if so, then there is no need to test the 'A' number at such a time, and if not, the 'A' number is used to initiate an outbound call 226 to the 'A' number. The time window to test the 'A' number (recently verified) may be one or more hours, one or more days, weeks, months, etc. The 'A' party is called by a pre-agreed upon 'known' number that the enterprise client is setup to identify. The enterprise calling platform 120 will receive the call 228 from the known call center number. The enterprise calling platform 120 may have a customized setup for their inbound call flow to direct that particular call to a process that identifies the return path back to the verification platform using the same 'A' number dialed. The verification platform 110 may then write a record in memory of the attempt for the 'A' party that is valid for a limited TTL window 232. The initial outbound record of this call attempt is later used to determine on a return call path if the call verification was completed or if the verification was never completed because the 'A' party never responded or responded too late to be considered successful. Verification may be considered completed when a database record is made to track the start of a verification attempt to 'A' parties within a valid TTL window.

Figure 3:
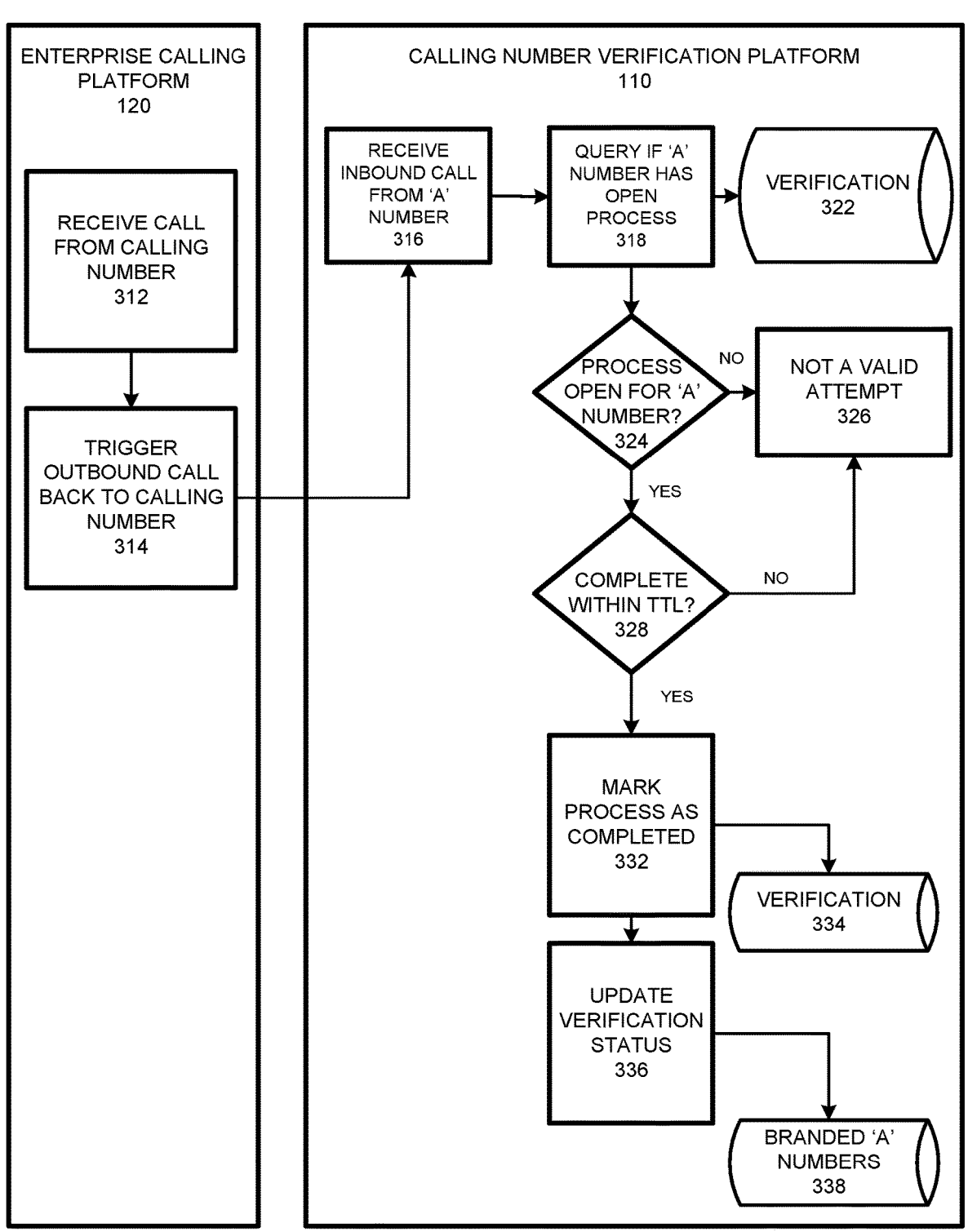
FIG. 3 illustrates a call network configuration of verifying enterprise calling numbers by an inbound call process according to example embodiments.

FIG. 3 illustrates a call network configuration of verifying enterprise calling numbers by an inbound call process according to example embodiments. Referring to FIG. 3, the return call path from the enterprise 120 to the verification platform may include the verification of the 'A' party. This process may include the enterprise calling platform being set up ahead of time for an inbound call flow to trigger the process back to the verification platform to complete the automated verification process. The enterprise calling platform 120 may receive a call 312 and initiate a return call back 314 to the known number used to call in from the same enterprise owned 'A' number. The automated calling number verification process receives the call 316 back from the 'A' number from the enterprise calling platform 120 which initiates a call center inbound process for determining if this is a valid response. The process may include querying 318 the verification database 322 to determine what is known for the 'A' number party. The database 322 may track the state of the call for the 'A' parties within a valid TTL window. The state data is stored in another database for later evaluation over a period of time to determine trends associated with the enterprise calling entities managing their 'A' numbers. During the inbound call process, a check may be performed to validate if there is an open (active) attempt 314 to verify the 'A' party calling into the inbound verification call path. If there is no open attempt, then the process does not consider the verification to be active 326. This check is to identify unprompted or spoof attempts on an 'A' number verification process. If the process is active, then a check is performed to validate if the 'A' party responded within the TTL window 328. If the response is late or unprompted the process will not mark the 'A' number as passing the verification process 324. If the process is completed 332, the verification record for the responding 'A' party is marked as verified 334. The 'A' party has passed automated verification. The evaluation of the 'A' number having passed recent verification may cause an update to the status 336 of the 'A' number. The recently verified 'A' number may be stored in a pool of verified 'A' numbers which are active and considered branded numbers 338 that the enterprise may use to dial calls.

The results of the evaluation are based on separate call flows in two directions since the verification platform 110 initially sends the outbound connection to the enterprise platform 120 and requires a response call back to complete the verification process. Since these two call flows happen in two different time ranges within the allowed TTL, the automated calling number verification process reviews the results of the evaluation of each 'A' party in a separate process flow.

Figure 4:
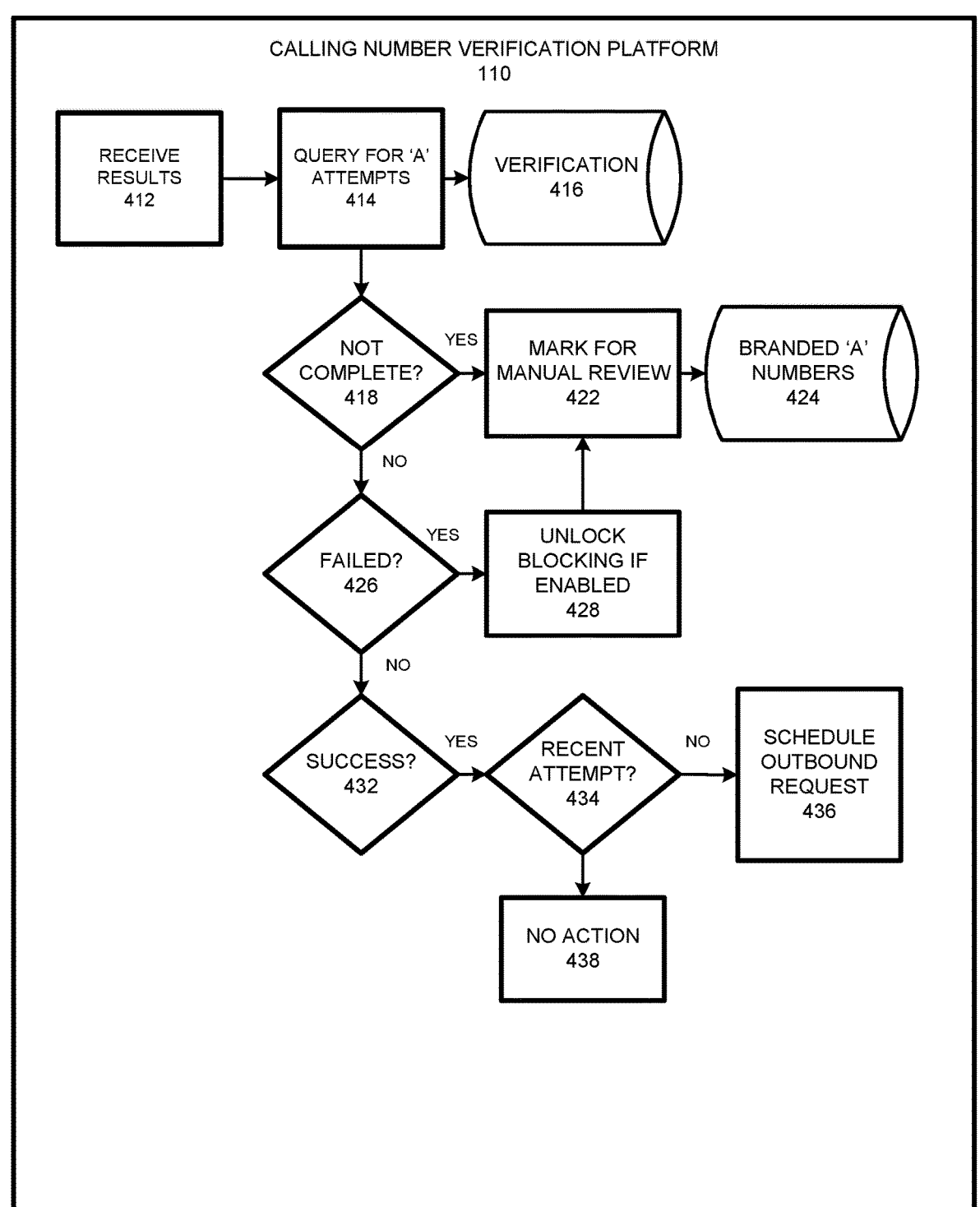
FIG. 4 illustrates a call network configuration of evaluating enterprise calling numbers according to example embodiments.

FIG. 4 illustrates a call network configuration of evaluating enterprise calling numbers according to example embodiments. Referring to FIG. 4, the calling number verification platform 110 may receiver verification results 412 and review the results of the attempted and completed verification processes. This process includes cycling through various 'A' numbers by to identify what final status those numbers received. The process may query 414 the verification database 416 for 'A' numbers that have been verified. The database may track the state of call attempts to enterprise 'A' numbers within a valid TTL window. At this stage of the process the platform is reviewing if there was a successful outbound call to the 'A' numbers and whether a return inbound call was received from the same 'A' number (s). This may include determining whether the outbound step was successful and the return inbound call from the 'A' party arrived. If this is the final state and the process is not complete 418, the 'A' number is flagged/marked for manual review 422 of the results of the status of contacting the 'A' number parties stored in the number database 424. A check is performed if there was a failure 426. A failure would be defined as the outbound call not connecting to the 'A' party or connecting to an IVR system or a person answered. Since this is an automated handshake process, those results would be viewed as a failure of the verification process. One possibility is unblocking any blocking of the 'A' numbers if already set in the system database, then the number is released 428 and then sent back for manual review 422.

The successful verifications 432 are then identified as to whether they are recent or too old based on a time measurement for recent checks 434, such as an age of the last successful attempt to see if another attempt to start the verification process is required (e.g., 5, 7, 30, 60, 90 days, etc.). This ensures that there could be a reverifying process for the 'A' number(s) at regular intervals. The priority for qualified numbers would be based on a stricter use case of the numbers such as those which were blocked. As an 'A' number may need to be reverified, a schedule request may be submitted 436 for the automated verification process to run for the 'A' number sometime in the future. This part of the process is activated when a successful run has happened previously to avoid negative reattempts which will continue to fail the verification process. When the last attempt for verification was inside the verification time window then no action is necessary 438.

In general, the enterprise calling platform side is not notified ahead of time when the automated calling number verification process will attempt/re-attempt to perform the verification handshake process. This will also limit any attempted 'spoof' attempts available to trick the process, and provides a way for reverification to be performed for the 'A' numbers at intervals determined by the usage intervals of that particular 'A' number.

FIG. 5 illustrates an example calling number verification process according to example embodiments. Referring to FIG. 5, the process may include selecting an enterprise number to verify from a database of one or more enterprise numbers assigned to a particular enterprise entity 502, initiating an outbound call destined to the enterprise number from an origination number known to an enterprise platform 504, receiving a return call to the origination number from the enterprise number 506, determining whether the return call was received within a defined time interval 508, and updating the enterprise number status in memory as a verified enterprise number when the return call was received within the defined time interval 510.

The process may also include determining the enterprise number was verified previously within another defined time interval that is a longer time than the defined time interval, and cancelling the outbound call to the enterprise number, or determining the assigned enterprise number was not verified previously within another defined time interval that is a longer time than the defined time interval. The process may also include that the updating the assigned enterprise number status in memory as a verified enterprise number further includes updating a verification record to include the verified enterprise number and the defined time interval.

The process may also include responsive to receiving the return call, determining whether a verification process is active for the enterprise number and the return call was received prior to expiration of the defined time interval, and the updating the enterprise number status in memory as a verified enterprise number further includes pairing the verified enterprise number with enhanced content to be sent with a subsequent call by the verified enterprise number. In one example, the return call is placed from the enterprise number and is placed to the origination number. The return call may be placed from another assigned enterprise number to the known verification platform number or to another known verification platform number. The return call to the outbound call is merely a confirmation to affirm the 'A' number being verified is properly verified. The return call origination number and the number dialed during the return call do not have to include the known number or the 'A' number. The return call process can include different 'to' and 'from' numbers which are known to both parties but which were not part of the original verification call.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EE-PROM"), registers, hard disk, a removable disk, a compact disk read-only memory ("CD-ROM"), or any other form of storage medium known in the art.

Figure 6:
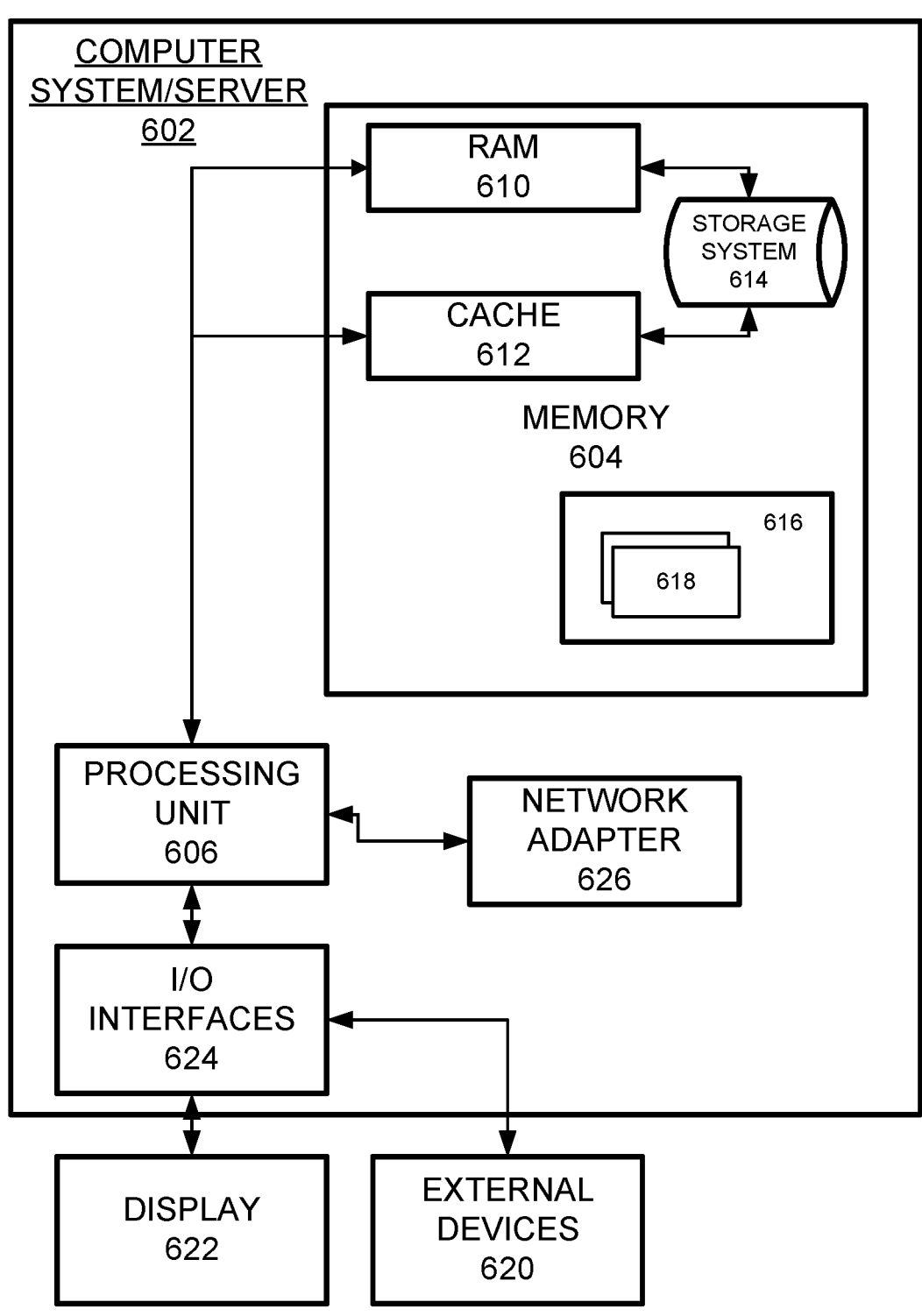
FIG. 6 illustrates an example network entity device configured to store instructions, software, and corresponding hardware for executing the same according to example embodiments.

FIG. 6 is not intended to suggest any limitation as to the scope of use or functionality of embodiments of the application described herein. Regardless, the computing node 600 is capable of being implemented and/or performing any of the functionality set forth hereinabove.

In computing node 600 there is a computer system/server 602, which is operational with numerous other general purpose or special purpose computing system environments or configurations. Examples of well-known computing systems, environments, and/or configurations that may be suitable for use with computer system/server 602 include, but are not limited to, personal computer systems, server computer systems, thin clients, rich clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 602 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 602 may be practiced in distributed cloud computing environments where tasks are performed by remote processing devices that are linked through a communications network. In a distributed cloud computing environment, program modules may be located in both local and remote computer system storage media including memory storage devices.

As displayed in FIG. 6, computer system/server 602 in cloud computing node 600 is displayed in the form of a general-purpose computing device. The components of computer system/server 602 may include, but are not limited to, one or more processors or processing units 604, a system memory 606, and a bus that couples various system components including system memory 606 to processor 604.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 602 typically includes a variety of computer system readable media. Such media may be any available media that is accessible by computer system/server 602, and it includes both volatile and non-volatile media, removable and non-removable media. System memory 606, in one embodiment, implements the flow diagrams of the other figures. The system memory 606 can include computer system readable media in the form of volatile memory, such as random-access memory (RAM) 610 and/or cache memory 612. Computer system/server 602 may further include other removable/non-removable, volatile/non-volatile computer system storage media. By way of example only, storage system 614 can be provided for reading from and writing to a non-removable, non-volatile magnetic media (not displayed and typically called a "hard drive"). Although not displayed, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 606 may include at least one program product having a set (e.g., at least one) of program modules that are configured to carry out the functions of various embodiments of the application.

Program/utility 616, having a set (at least one) of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 602 may also communicate with one or more external devices 620 such as a keyboard, a pointing device, a display 622, etc.; one or more devices that enable a user to interact with computer system/server 602; and/or any devices (e.g., network card, modem, etc.) that enable computer system/server 602 to communicate with one or more other computing devices. Such communication can occur via I/O interfaces 624. Still yet, computer system/server 602 can communicate with one or more networks such as a local area network (LAN), a general wide area network (WAN), and/or a public network (e.g., the Internet) via network adapter 626. As depicted, network adapter 626 communicates with the other components of computer system/server 602 via a bus. It should be understood that although not displayed, other hardware and/or software components could be used in conjunction with computer system/server 602. Examples include, but are not limited to: microcode, device drivers, redundant processing units, external disk drive arrays, RAID systems, tape drives, and data archival storage systems, etc.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method performed by a verification platform, the method comprising:

selecting an enterprise number for verification from a database, wherein the enterprise number is assigned to an enterprise entity;

initiating an outbound call to the enterprise number from an origination number known to an enterprise platform;

receiving a return call to the origination number from the enterprise number;

determining whether the return call was received within a defined time interval; and updating a status of the enterprise number as a verified enterprise number in response to the return call being received within the defined time interval.

2. The method of claim 1, comprising:

determining the enterprise number was previously verified within a different, longer time interval; and canceling the outbound call to the enterprise number.

3. The method of claim 1, comprising:

determining the enterprise number was not previously verified within a different, longer defined time interval.

4. The method of claim 1, wherein the updating of the status comprises:

updating a verification record to include the verified enterprise number and the defined time interval.

5. The method of claim 1, comprising:

responsive to receiving the return call, determining whether a verification process is active for the enterprise number, and whether the return call was received before an expiration of the defined time interval.

6. The method of claim 1, wherein the updating of the status comprises:

pairing the verified enterprise number with enhanced content to be sent with a subsequent call using the verified enterprise number.

7. The method of claim 1, wherein the initiating of the outbound call comprises:

automatically initiating the outbound call without manually dialing.

8. An apparatus comprising:

a processor configured to:

select an enterprise number for verification from a database, wherein the enterprise number is assigned to an enterprise entity;

initiate an outbound call to the enterprise number from an origination number known to an enterprise platform;

determine whether a return call to the origination number from the enterprise number was received within a defined time interval; and update a status of the enterprise number as a verified enterprise number in response to the return call being received within the defined time interval.

9. The apparatus of claim 8, wherein the processor is configured to:

determine that the enterprise number was previously verified within a different, longer time interval; and cancel the outbound call to the enterprise number.

10. The apparatus of claim 8, wherein the processor is configured to:

determine the enterprise number was not previously verified within a different, longer defined time interval.

11. The apparatus of claim 8, wherein the update to the status includes the verified enterprise number and the defined time interval.

12. The apparatus of claim 8, wherein the processor is configured to:

responsive to the return call being received, determine whether a verification process is active for the enterprise number, and whether the return call was received before an expiration of the defined time interval.

13. The apparatus of claim 8, wherein, when the processor updates the status, the processor is configured to:

pair the verified enterprise number with enhanced content to be sent with a subsequent call using the verified enterprise number.

14. The apparatus of claim 8, wherein, when the processor initiates the outbound call, the processor is configured to:

automatically initiate the outbound call without manually dialing.

15. A non-transitory computer-readable medium storing instructions that, when executed by a processor, cause the processor to perform:

selecting an enterprise number for verification from a database, wherein the enterprise number is assigned to an enterprise entity;

initiating an outbound call to the enterprise number from an origination number known to an enterprise platform;

receiving a return call to the origination number from the enterprise number;

determining whether the return call was received within a defined time interval; and updating a status of the enterprise number as a verified enterprise number in response to the return call being received within the defined time interval.

16. The non-transitory computer-readable medium of claim 15, wherein the instructions cause the processor to perform:

determining the enterprise number was previously verified within a different, longer time interval; and canceling the outbound call to the enterprise number.

17. The non-transitory computer-readable medium of claim 15, wherein the instructions cause the processor to perform:

determining the enterprise number was not previously verified within a different, longer defined time interval.

18. The non-transitory computer-readable medium of claim 15, wherein the updating of the status comprises:

updating a verification record to include the verified enterprise number and the defined time interval.

19. The non-transitory computer-readable medium of claim 15, wherein the instructions cause the processor to perform:

responsive to receiving the return call, determining whether a verification process is active for the enterprise number, and whether the return call was received before an expiration of the defined time interval.

20. The non-transitory computer-readable medium of claim 15, wherein the updating of the status comprises:

pairing the verified enterprise number with enhanced content to be sent with a subsequent call using the verified enterprise number.

\* \* \* \* \*